United States Patent
Reichel

(10) Patent No.: US 9,862,544 B2
(45) Date of Patent: Jan. 9, 2018

(54) BRAKING DEVICE FOR A ROLLER CONVEYOR, ROLLER CONVEYOR AND METHOD FOR PRODUCING A BRAKING DEVICE FOR A ROLLER CONVEYOR

(71) Applicant: Interroll Holding AG, Sant'Antonino (CH)

(72) Inventor: Ulrich Reichel, Weinheim (DE)

(73) Assignee: Interroll Holding AG, Sant'Antonino (CH)

( * ) Notice: Subject to any disclaimer, the term of this patent is extended or adjusted under 35 U.S.C. 154(b) by 0 days.

(21) Appl. No.: 15/122,752

(22) PCT Filed: Mar. 6, 2015

(86) PCT No.: PCT/EP2015/000505
§ 371 (c)(1),
(2) Date: Aug. 31, 2016

(87) PCT Pub. No.: WO2015/135637
PCT Pub. Date: Sep. 17, 2015

(65) Prior Publication Data
US 2017/0210565 A1    Jul. 27, 2017

(30) Foreign Application Priority Data
Mar. 11, 2014    (DE) .................. 10 2014 003 430

(51) Int. Cl.
*B65G 13/07*    (2006.01)
*B65G 13/075*   (2006.01)

(52) U.S. Cl.
CPC ........... *B65G 13/075* (2013.01); *B65G 13/07* (2013.01)

(58) Field of Classification Search
CPC .................................. B65G 13/075
USPC ................... 193/35 A; 198/780, 781
See application file for complete search history.

(56) References Cited

U.S. PATENT DOCUMENTS

| | | | | |
|---|---|---|---|---|
| 3,789,960 A | * | 2/1974 | Warren ................... | F16D 63/00 188/110 |
| 4,000,796 A | * | 1/1977 | Bolton ................ | B65G 13/075 188/262 |
| 4,723,646 A | * | 2/1988 | Scheneman, Jr. .... | B65G 13/075 188/83 |

(Continued)

FOREIGN PATENT DOCUMENTS

| | | |
|---|---|---|
| CH | 414 455 | 12/1966 |
| DE | 1 295 472 | 5/1969 |

(Continued)

OTHER PUBLICATIONS

International Search Report.
German Office Action.

*Primary Examiner* — Douglas Hess
(74) *Attorney, Agent, or Firm* — Gerald E. Hespos; Michael J. Porco; Matthew T. Hespos

(57) ABSTRACT

A braking device for a roller conveyor has at least one brake pad (40) for engagement with an outer circumference of at least one conveyor roller (60) of the roller conveyor. The braking device also has an eccentric shaft (20) with a first eccentric (24) for moving the brake pad (40) toward the conveyor roller (60) and away therefrom; and a stepping motor (10) for rotating the eccentric shaft (20). A roller conveyor and to a method for producing a braking device also are provided.

10 Claims, 8 Drawing Sheets

(56) References Cited

U.S. PATENT DOCUMENTS

| | | | | |
|---|---|---|---|---|
| 5,375,689 | A | * | 12/1994 | Sapp ..................... B65G 13/075 193/35 A |
| 6,220,418 | B1 | * | 4/2001 | Moradians ........... B65G 13/075 193/35 A |
| 6,471,043 | B2 | * | 10/2002 | Schwingshandl ...... B65G 13/07 198/781.06 |
| 6,820,736 | B2 | * | 11/2004 | Itoh ........................ B65G 39/02 198/780 |
| 7,021,456 | B2 | * | 4/2006 | Haan ................... B65G 13/075 193/35 A |
| 8,607,965 | B2 | * | 12/2013 | Sejourne .............. B65G 13/075 193/35 A |
| 9,352,908 | B1 | * | 5/2016 | Fourney ................. B65G 17/24 |

FOREIGN PATENT DOCUMENTS

| | | |
|---|---|---|
| DE | 25 50 143 | 5/1976 |
| DE | 198 51 668 | 5/2000 |
| DE | 196 28 711 | 8/2001 |
| FR | 2 467 152 | 4/1981 |
| JP | H0654614 U | 7/1994 |
| JP | 7-2327 | 1/1995 |
| JP | 8-113335 | 5/1996 |
| JP | 8-217214 | 8/1996 |
| JP | 2003-160215 | 6/2003 |
| WO | 03/044386 | 5/2003 |

\* cited by examiner

BRAKING DEVICE FOR A ROLLER CONVEYOR, ROLLER CONVEYOR AND METHOD FOR PRODUCING A BRAKING DEVICE FOR A ROLLER CONVEYOR

BACKGROUND

1. Field of the Invention

The present invention relates to a braking device for a roller conveyor, a roller conveyor equipped with said braking device and to a method for producing a braking device.

2. Description of the Related Art

In order to stop articles transported on a roller conveyor such as packets and the like at predetermined positions of a conveyor path, a roller conveyor is equipped with braking devices for decelerating or stopping predetermined conveyor rollers at a predetermined point of time. To this end, the document CH 414 455 discloses a braking device integrated into a conveyor roller of the roller conveyor. In this system, replacing or repairing the braking device is complicated, as the braking device must be removed from the conveyor roller.

To reduce the downtimes of a roller conveyor, there is a need for a braking device that is easy to replace.

SUMMARY

According to a first aspect of the invention, there is provided a braking device for a roller conveyor, comprising: at least one brake pad for engagement with an outer circumference of at least one conveyor roller of the roller conveyor; an eccentric shaft having a first eccentric for moving the brake pad towards the conveyor roller and away therefrom; and a stepping or servo or stepper motor for rotating the eccentric shaft.

By the brake pad engaging with an outer circumference of the conveyor roller of the roller conveyor, the entire braking device can be mounted outside the conveyor rollers, i.e. externally, in a roller conveyor. In this way, the braking device can easily be replaced with a second braking device in case of malfunctions. By the eccentric shaft moving the brake pad both towards the conveyor roller and away therefrom, a very accurate deceleration can be achieved by means of the motor at a given point of time. In addition, an unwanted braking engagement after releasing the brake can be prevented by moving the brake pad away from the conveyor roller.

The motor may be a 24 V DC motor.

The brake pad may have a hole for rotatably receiving the first eccentric. This ensures a uniform movement of the brake pad corresponding to the contour of the eccentric.

By engaging a driving gear of the eccentric shaft with a driven gear of the stepping motor, a driving shaft of the stepping motor can be arranged farther away from the conveyor roller to be decelerated to achieve a compact configuration of the entire braking device.

The eccentric shaft may further comprise at least one second eccentric that is offset from the first eccentric and that functions as a bearing seat for bearing a rotatable roller.

By the eccentric shaft further comprising the second eccentric, a driving belt for the conveyor roller of the roller conveyor can be pressed against the previously decelerated conveyor roller of the roller conveyor by the rotatable roller after having retracted the brake pad in order to ensure a suitable frictional engagement of the driving belt with the conveyor roller to be driven. In other words, the brake pad can be pressed against the conveyor roller to be decelerated by the first eccentric being moved towards the conveyor roller, while after having decelerated and driven the conveyor roller as desired, the first brake pad is moved away from the conveyor roller by the first eccentric, while simultaneously the second eccentric is moved towards the conveyor roller. In this way, the brake pad is retracted from the conveyor roller while simultaneously the rotatable roller is moved toward the conveyor roller to be driven in order to press a driving belt against the conveyor roller.

The rotatable roller may be molded from a plastic material. Further preferably, the rotatable roller has a pair of roller bearings. Examples include ball bearings, needle bearings or the like. However, slide bearings can be used as well.

The brake pad may comprise two friction surfaces that are connected to each other by means of a yoke or a ridge. Thus, for example two adjacent conveyor rollers can simultaneously be decelerated by the braking device.

The eccentric shaft may have a base body with a polygonal cross-section. Accordingly, the eccentric shaft and the braking device can be configured modularly by connecting the driving gear and the first and second eccentrics to the base body in a form-locking manner. Thus, other configurations of the braking device and the eccentric shaft can easily be made available. The base body may be made from a hexagonal rod material for example.

The stepping motor may have a controller that switches off or limits the power supply when a predetermined or predeterminable or adjustable period of time has elapsed after a predetermined or predeterminable or adjustable current value has been exceeded. Here, the controller is integrated into or arranged in the braking device or the stepping motor such that the braking device receives only a braking signal from outside (externally). Switching off or limiting the power supply is performed by the internal controller.

Both the eccentric shaft and the stepping motor may be mounted to a frame of the braking device. Thus, the braking device forms a compact unit that can be mounted to a roller conveyor and can easily be replaced if necessary. For assembling/disassembling the braking device, the latter is hooked and/or fixed to a frame of the roller conveyor by suitable fixing means, such as screws, bolts, hooks, quick fasteners, and the like.

The roller conveyor may have plural rotatable conveyor rollers arranged in a frame and driven by a flat belt with the conveyor rollers being in frictional engagement with the flat belt. Here, at least one braking device as described above is mounted to the frame of the roller conveyor for decelerating at least one conveyor roller.

According to one further aspect, a method for producing a braking device for a roller conveyor is provided. The method comprises the following steps: providing an eccentric shaft with a polygonal cross-section; arranging at least one first eccentric on the eccentric shaft in a form-locking manner to prevent a relative rotation of the first eccentric relative to the eccentric shaft; engaging at least one brake pad with the first eccentric; and providing a stepping motor for driving the eccentric shaft.

With reference to the accompanying drawings, the invention will now be explained in more detail using an embodiment.

DETAILED DESCRIPTION

Figure 1:
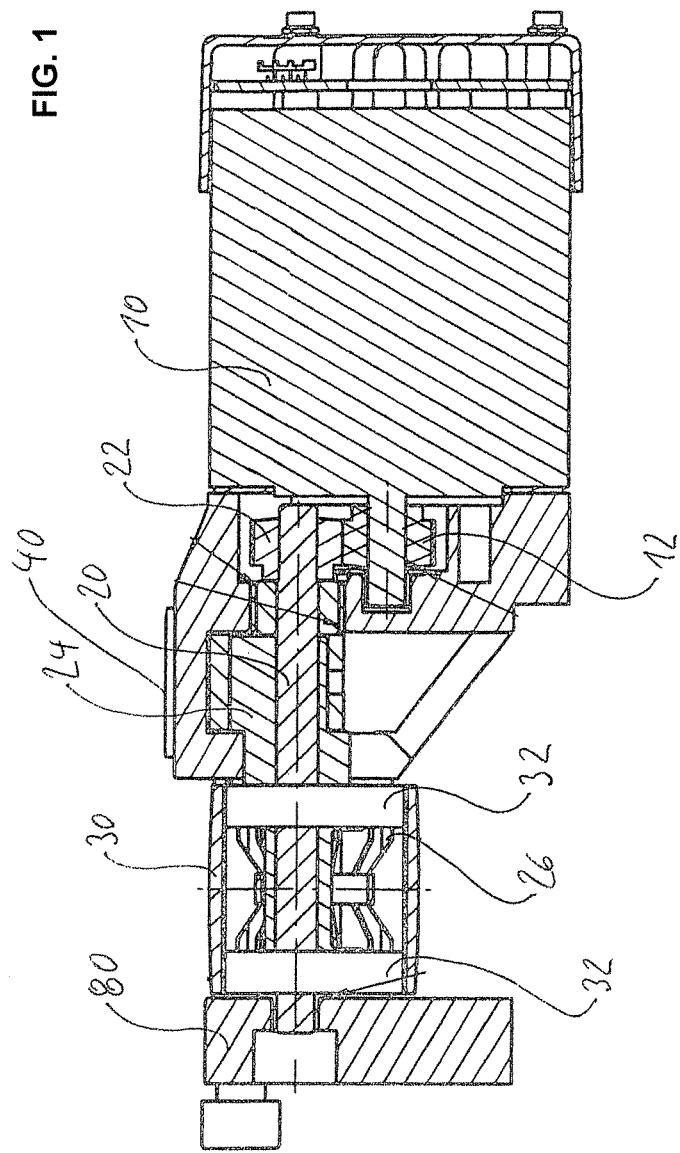
FIG. 1 shows a cross-section of the braking device.
Figure 2:
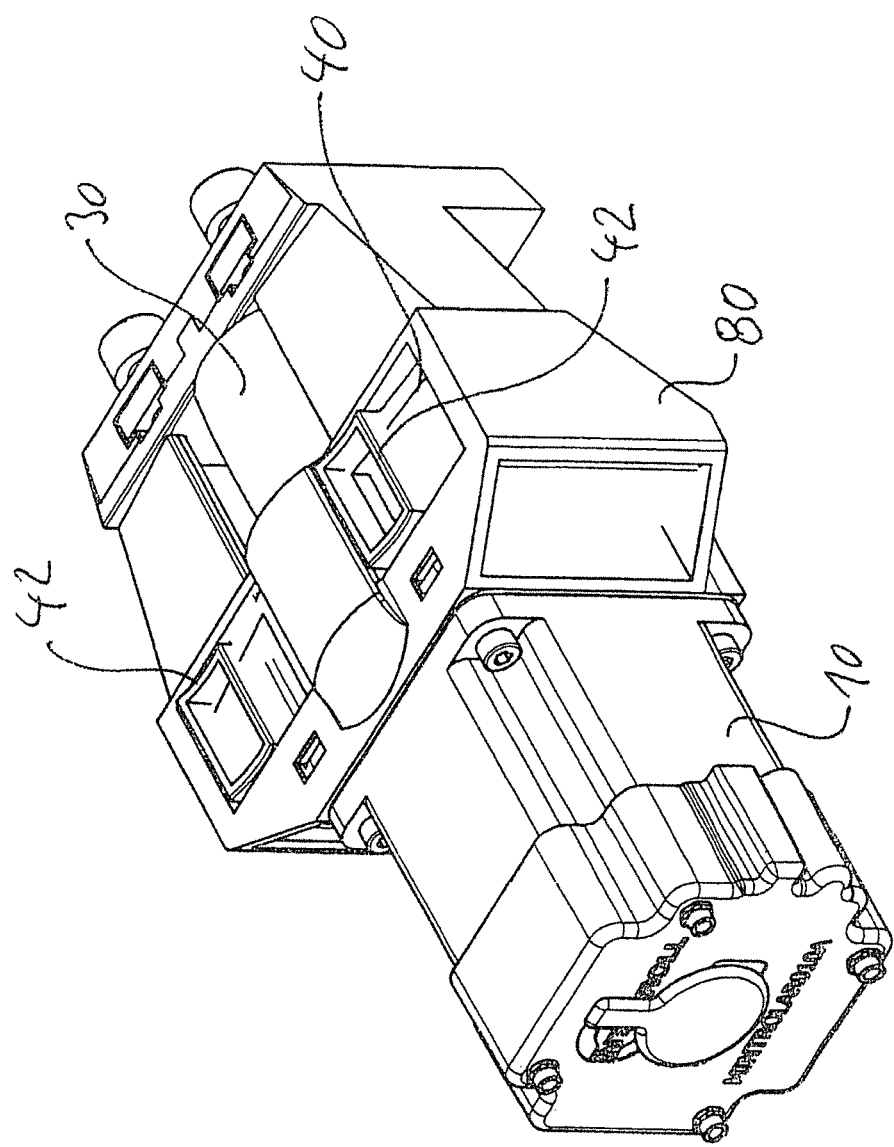
FIG. 2 shows a perspective view of the braking device.

As shown in FIGS. 1 and 2, the braking device comprises a stepping motor 10 (stepper motor) or servomotor that can be stopped in predetermined angular increments by a low-voltage control correspondingly triggering it. For example, the stepping motor can exactly be stopped in increments of 1.8 degrees, i.e. in two hundred increments per revolution. The stepping motor 10 has a driven gear 12 for driving an eccentric shaft 20 by a driving gear 22 that is connected fixedly to the eccentric shaft 20.

Preferably, both the eccentric shaft 20 and the stepping motor 10 are mounted to a frame 80 of the braking device. Thus, the braking device forms a compact unit that can be mounted to a roller conveyor and can easily be replaced if necessary. For assembling/disassembling the braking device, the braking device is hooked and/or fixed to a frame 50 of the roller conveyor (shown in FIG. 8) by suitable fixing means, such as screws, bolts, hooks, quick fasteners, and the like.

Figure 3:
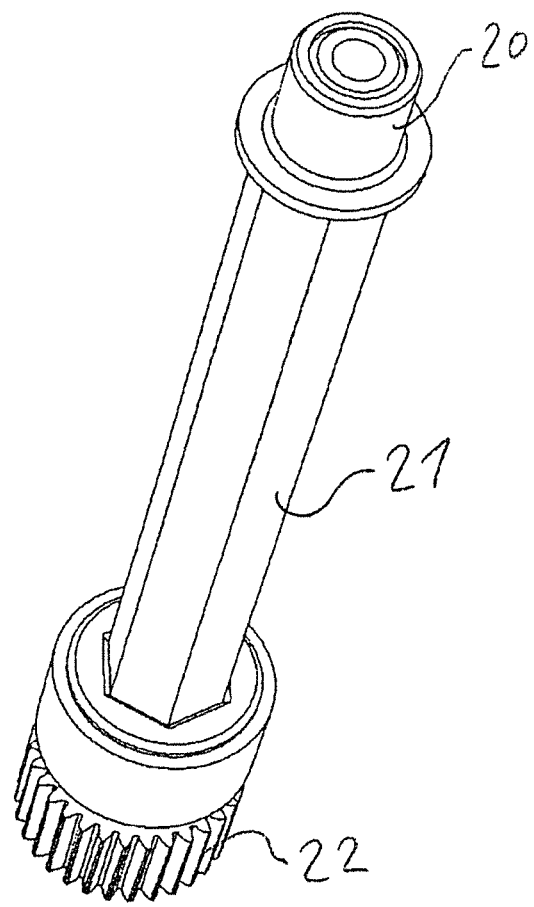
FIG. 3 shows a detailed perspective view of the eccentric shaft with a driving gear mounted thereto.

To this end, the eccentric shaft has, as shown for example in FIG. 3, a base body 21 with a polygonal cross-section. For example, a hexagonal bar is used as the base body 21 with a polygonal cross-section, and the driving gear 22 has a corresponding hexagonal hole (not shown) for engaging with the base body 21 in a form-locking manner. However, the invention is not limited to a hexagonal bar; any other polygonal cross-section for the base body 21 can be applied as well. Examples include a triangular cross-section, an elliptical cross-section, a pentagonal cross-section, an octagonal cross-section, a square cross-section or the like. Moreover, a multi-tooth cross-section can be used.

Figure 4:
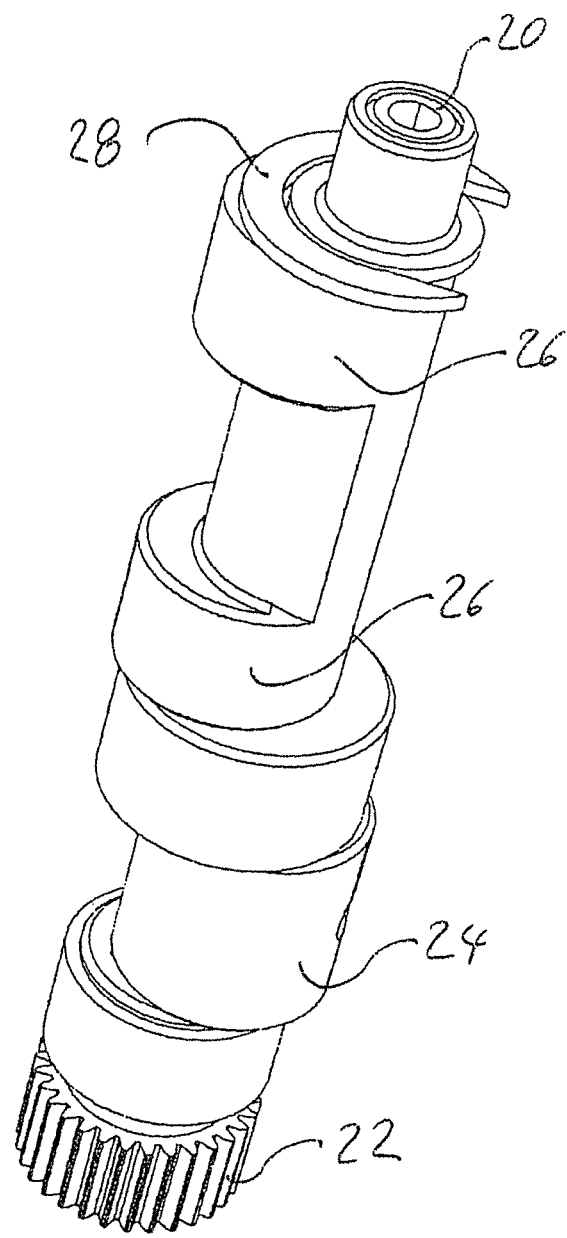
FIG. 4 shows the eccentric shaft of FIG. 3 after having mounted a first eccentric and a pair of second eccentrics.

Further, eccentrics 24, 26 can be mounted to the base body 21, as shown in FIG. 4. The eccentrics 24, 26 are preferably circular; their reception hole is arranged offset from a center point of the outer circumference such that the eccentrics 24, 26 rotate eccentrically about the center point thereof when the eccentric shaft 20 rotates.

Figure 5:
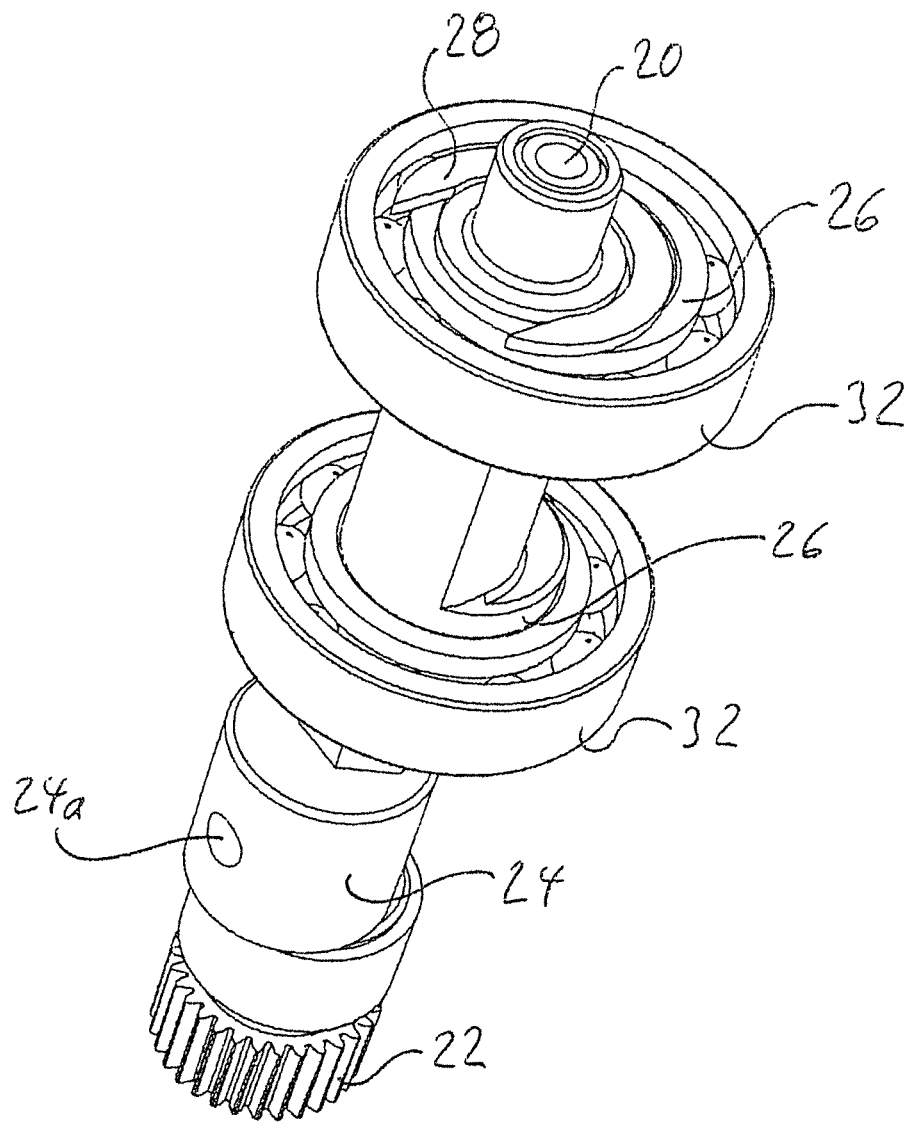
FIG. 5 shows the eccentric shaft of FIG. 4 after having mounted bearings to the second eccentrics.

Here, the first eccentric 24 serves to actuate a brake pad (not shown in FIG. 4), which will be described later. Further, as shown in FIG. 5, roller bearings 32 can be attached to the second eccentric 26 and can rotate eccentrically about the eccentric shaft 20 in the above described manner.

Figure 6:
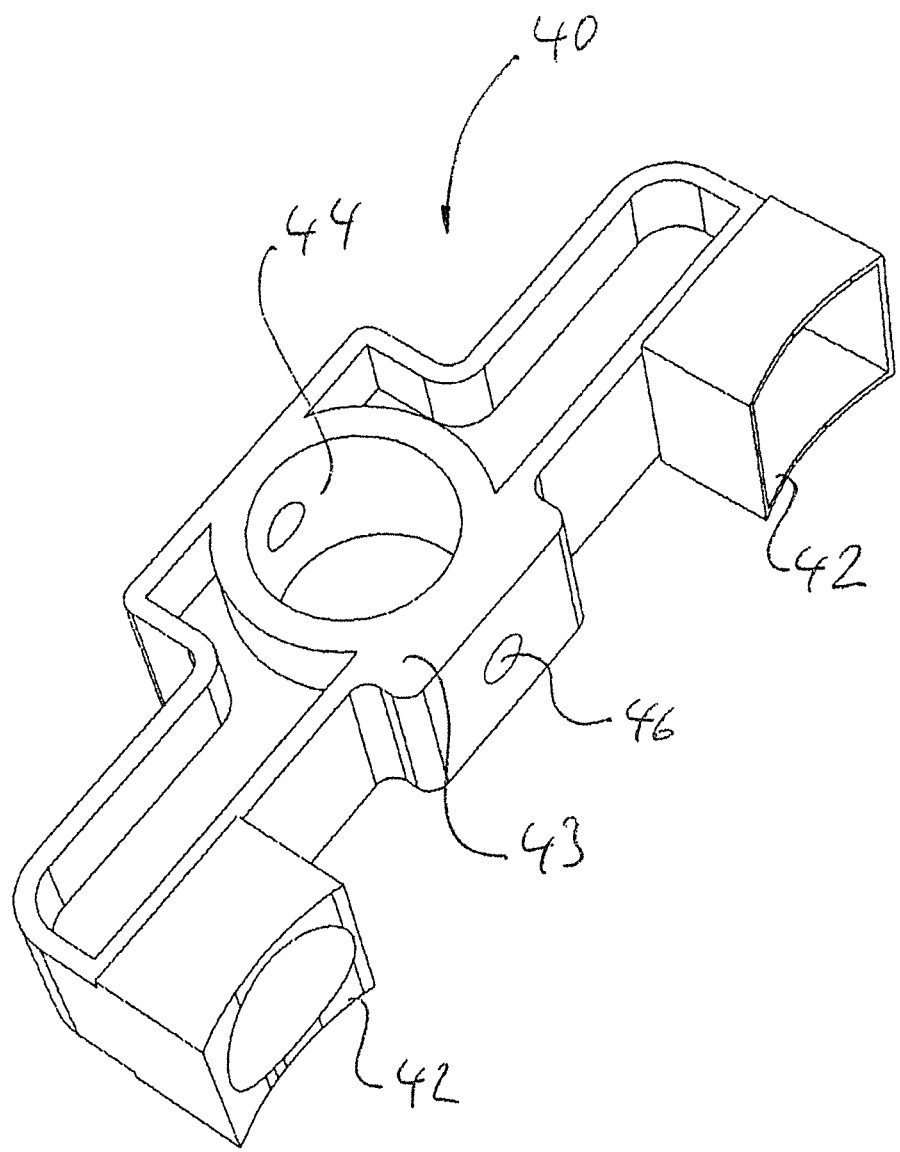
FIG. 6 shows a perspective view of the brake pad having a pair of braking surfaces.

FIG. 6 shows a brake pad 40 having a pair of braking surfaces 42, 42 that are connected to each other by a yoke or a ridge 43. However, the invention is not limited to arranging two braking surfaces 42, 42. According to how many conveyor rollers of the roller conveyor are to be decelerated by the braking device, arranging one braking surface or arranging more than two braking surfaces 42, 42 is likewise possible.

Furthermore, the brake pad 40 has a circular hole 44 into which the first eccentric 24 is inserted. In this way, the brake pad 40 is moved towards the conveyor roller to be decelerated and away therefrom when the first eccentric 24 is moved by rotating the eccentric shaft 20. Thus, no means for transmitting power from the driving eccentric 24 to the brake pad 40 or to the braking surfaces 42, 42 are required; in particular no restoring means, such as springs or the like, are required. Therefore, aligning and mounting levers and springs and assembling a multi-component braking device are superfluous.

Figure 7:
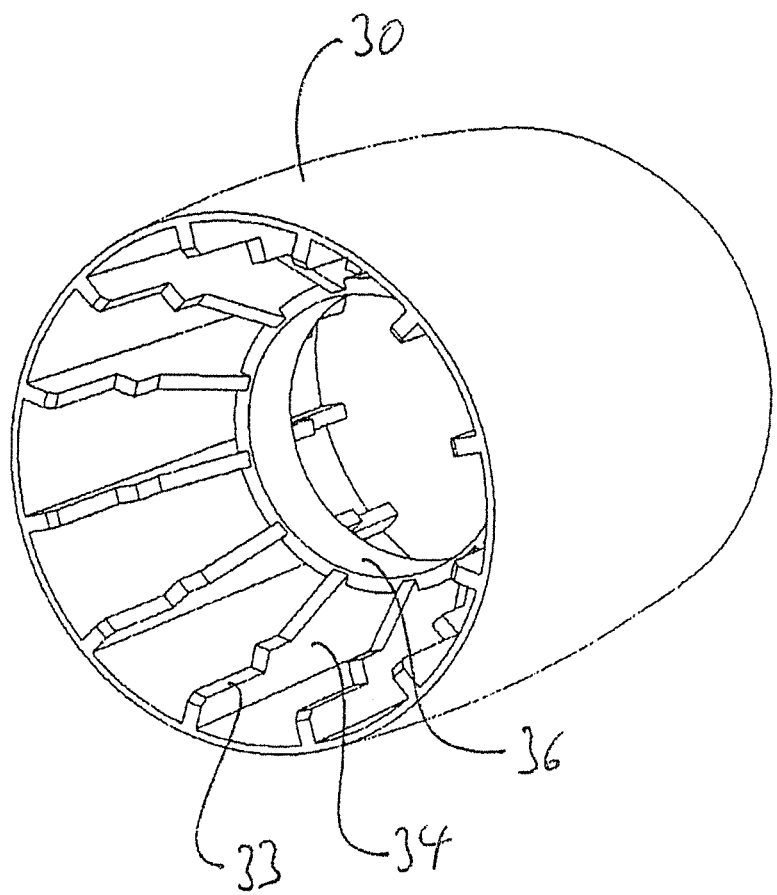
FIG. 7 shows a perspective view of the roller before mounting it to the roller bearings of the eccentric shaft.

Furthermore, a rotatable roller 30 as shown in FIG. 7 is attached to the roller bearings 32, 32 by inserting an outer race of the roller bearing 32 into a bearing seat 33 of the rotatable roller 30. Preferably, the bearing seat 33 has an interference fit for press-fitting the outer race of the roller bearing 32. Alternatively, the bearing seat 33 has a transition fit. The bearing seat 33 is formed by a plurality of ribs 34 that extend axially within the rotatable roller 30. In order to reinforce the ribs 34, at least one connecting ridge 36 preferably is arranged in a central position in the axial direction of the rotatable roller 30. On the axially opposite side of the rotatable roller 30, a corresponding bearing seat 33 is arranged such that the rotatable roller 30 is supported on the pair of second eccentrics 26, 26 by means of a pair of roller bearings 32, 32.

As shown particularly in FIG. 4, the first eccentric 24 is arranged offset from the second eccentrics 26, 26 in the circumferential direction of the eccentric shaft 20 by preferably about 180 degrees. In this way, either the brake pad 40 or the rotatable roller 30 is moved in a direction towards the conveyor rollers of the roller conveyor.

In the position of the eccentric shaft 20 shown in FIG. 1, the brake pad 40 is moved towards the conveyor rollers of the roller conveyer (not shown) in order to decelerate the conveyor rollers (not shown) by moving the first eccentric 24 in a direction towards the conveyor rollers. In this position, the second eccentrics 26, 26 are moved away from the conveyor rollers in order to move the rotatable roller 30 away from the conveyor rollers. Conversely, by rotating the eccentric shaft 20 by approximately 180 degrees, the first eccentric 24 is moved away from the conveyor rollers in order to disengage the brake pad 40 from the conveyor rollers. Here, the second eccentrics 26, 26 are moved in a direction toward the conveyor rollers in order to move the rotatable roller 30 against a driving belt (not shown) of the conveyor rollers. In this way, in the second position (not shown) of the braking device, the rotatable roller 30 is pressed against a driving belt (not shown) of the conveyor rollers in order to ensure a frictional engagement of the driving belt with the conveyor rollers.

According to one advantageous embodiment of the braking device, the brake pad 40 comes into contact with the conveyor roller to be decelerated already before reaching an upper dead center of the first eccentric 24, i.e. before reaching the eccentric's 24 most distant point from the center point of the eccentric shaft 20. When the brake pad 40 becomes thinner due to wear, the stepping motor 10 correspondingly rotates the eccentric 24 further such that an automatic adjustment of the brake pad 40 is ensured. Therefore, additional setting or adjusting means, such as levers, springs, cable pulls and the like, are superfluous.

Further preferably, a further rotation of the eccentric 24 is caused according to the thickness of the brake pad 40 by a current or torque controller of the stepping motor 10. For decelerating and applying the brake pad 40, the stepping motor 10 is not rotated by a predetermined angular amount; rather, when applying the brake pad 40 to the braking surface of the conveyor roller, a torque increase is detected by a controller of the stepping motor 10 due to a current increase of the stepping motor 10.

After having detected a current increase above a predetermined or predeterminable threshold value, a predetermined or predeterminable period of time elapses until the power supply is substantially switched off or adjusted to a lower current value after expiry of the period of time. Thus, an adjustment of the brake pad by means of the current controller of the stepping motor is caused which does not require further mechanical components.

The period of time during which high power is supplied is predetermined or adjustable by a timer of the controller. Here, said period of time is, for example, about 500 msec. However, other periods of time can be predetermined of adjusted as well, such as about 100 to 300 msec, or 1 to 2 seconds.

Further preferably, the controller is integrated into or arranged in the braking device or the stepping motor such that the braking device receives only a braking signal from outside (externally). Switching off or limiting the power supply is performed by the internal controller. For example, a board (not shown) or a circuit board or a PCB (printed circuit board) is arranged within the braking device or in or at the stepping motor 10 comprising the controller.

Figure 8:
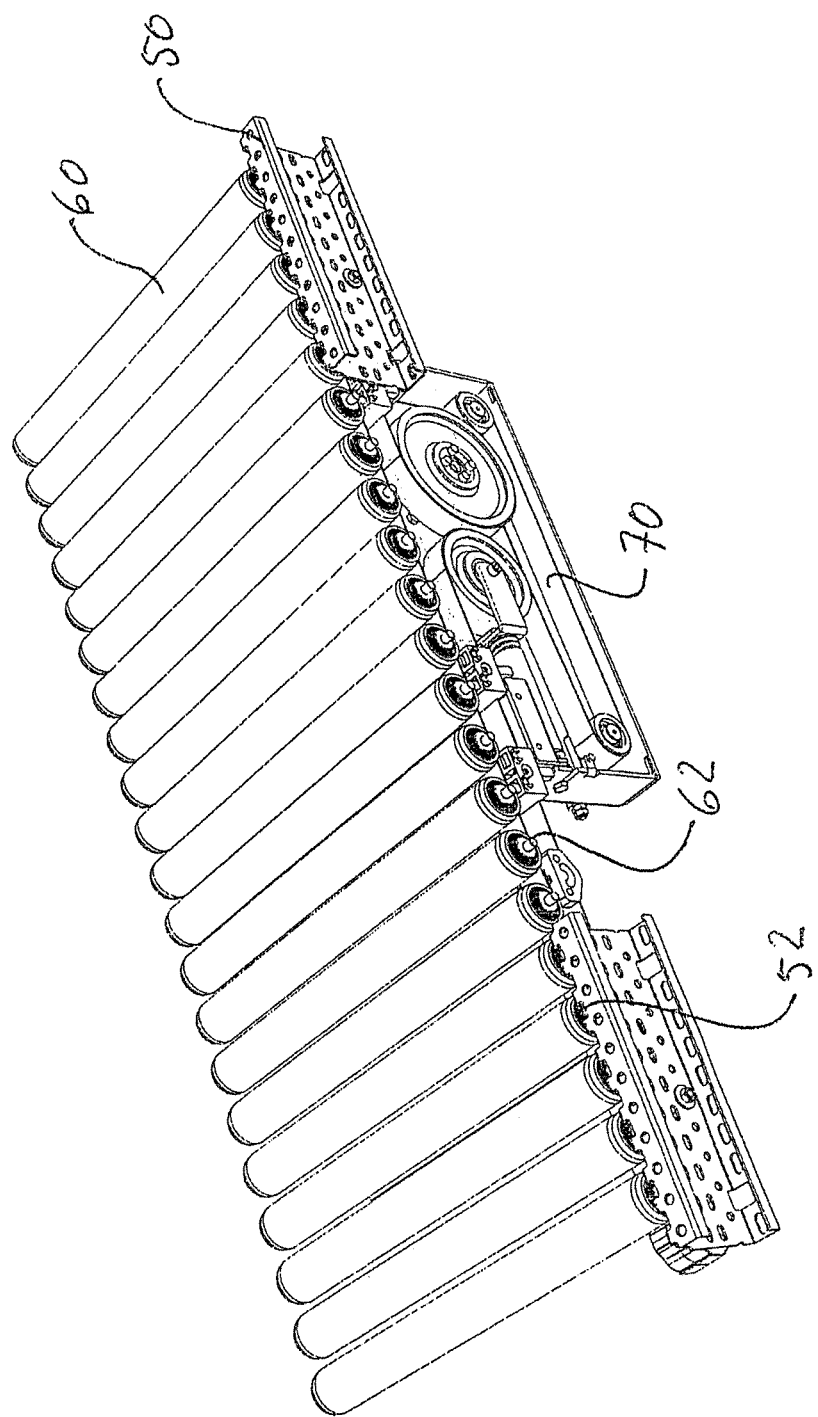
FIG. 8 shows a perspective view of a roller conveyor with the conveyor rollers being driven by a flat belt.

The roller conveyor with the plurality of conveyor rollers 60 is shown in FIG. 8. Here, the conveyor rollers 60 are mounted in a frame 50 by extensions 62 of the conveyor rollers 60 being mounted in corresponding grooves 52 of the frame 50. In this case, axial end portions of the conveyor rollers 60 rest on a flat belt 70 such that the conveyor rollers 60 are driven by the flat belt 70 due to a frictional engagement between the end portion of the conveyor rollers 60 and the flat belt 70.

The braking device is mounted to the roller conveyor beneath the conveyor rollers 60. After the conveyor rollers 60 have been mounted to the frame 50 by simply inserting the extensions 62 into the grooves 52 of the frame 50, the conveyor rollers 60 can slightly be lifted by the braking engagement of the braking device (not shown in FIG. 8) in order to be moved away from the flat belt 70 and in order to be stopped by the braking engagement with the brake pad 40. On the other hand, when the decelerated conveyor roller 60 is to be driven again, the eccentric 24 with the brake pad 40 is moved away from the conveyor roller 60 by reversing the stepping motor 10 correspondingly; the pair of second eccentrics 26 is moved with the rotatable roller 30 in a direction toward the conveyor rollers 60 in order to press the flat belt 70 against the previously decelerated conveyor roller 60. In this way, the conveyor roller 60 is driven by the flat belt 70 again.

Apart from being mounted to the frame 50, the conveyor rollers 60 can also be mounted for example by slide bearings or roller bearings. In this case, lifting the conveyor rollers 60 is superfluous.

Preferably, the brake pad 40 is produced or molded in one piece with the braking surfaces 42 42 arranged thereon.

The roller bearings 32, 32 can be commercially available ball bearings. However, other pivot bearings can be used as well, such as needle bearings or slide bearings or the like. The first eccentric 24, the second eccentric 26 and the driving gear 22 are secured as components on the eccentric shaft 20 in the axial direction, for example by inserting a circlip 28 into a groove of the eccentric shaft 20. The rotatable roller 30 preferably is molded from a plastic material, for example by injection molding EPDM, POM, ABS plastic material or the like.

Preferably, the eccentric shaft 20 is mounted rotatably in a frame 80 that is flanged to the stepping motor 10. Preferably, the hole 44 of the brake pad 40 has at least one lubrication hole 46 for lubricating or oiling the hole 44.

Furthermore, the first eccentric 24 preferably has a lubrication hole 24a for receiving a lubricant.

Although the brake pad is actuated by means of the first eccentric 24 in the embodiment, the invention is not limited thereto. Instead of the eccentrics 24, 26, there can also be used a different type of transmission that can convert an angular rotation of the stepping motor 10 into a translational movement of the brake pad 40 and/or the rotatable roller 30. Examples include lever arrangements, shifting links, camshafts with rockers and/or followers or the like.

LIST OF REFERENCE NUMBERS

10 stepper motor
12 driven gear
20 eccentric shaft
21 base body
22 driving gear
24 first eccentric
24a lubrication hole
26 second eccentric
28 circlip
30 rotatable roller
32 roller bearing
33 bearing seat
34 rib
36 connecting ridge
40 brake pad
42 braking surface
43 yoke or ridge
44 hole
46 lubrication hole
50 frame
52 groove
60 conveyor roller
62 extension
70 flat belt
80 frame

The invention claimed is:

1. A braking device for a roller conveyor, comprising: at least one brake pad (40) for engagement with an outer circumference of at least one conveyor roller (60) of the roller conveyor, the at least one brake pad having a hole; an eccentric shaft (20) having a first eccentric (24) rotatably received in the hole of the at least one brake and configured for moving the brake pad (40) towards the conveyor roller (60) and away therefrom; and a stepping motor (10) for rotating the eccentric shaft (20).

2. The braking device of claim 1, wherein a driven gear (12) of the stepping motor (10) engages with a driving gear (22) mounted to the eccentric shaft (20).

3. The braking device of claim 1, wherein the eccentric shaft (20) comprises at least one second eccentric (26) that is offset from the first eccentric (24) and defines a bearing seat for bearing a rotatable roller (30).

4. The braking device of claim 1, wherein the rotatable roller (30) is molded from a plastic material and/or has a pair of roller bearings (32).

5. The braking device of claim 1, wherein the brake pad (40) has two friction surfaces that are connected to each other by a yoke (43) or a ridge.

6. The braking device of claim 1, wherein the eccentric shaft (20) has a base body (21) with a polygonal cross-section.

7. The braking device of claim 1, wherein the stepping motor (10) has a controller that switches off or limits the power supply when a predetermined or predeterminable period of time has elapsed after a predetermined or predeterminable current value has been exceeded.

8. The braking device of claim 1, wherein both the eccentric shaft (20) and the stepping motor (10) are mounted to a frame (80) of the braking device.

9. A roller conveyor having a plurality of rotatable conveyor rollers (60) arranged in a frame (50), the conveyor rollers (60) being in frictional engagement with a flat belt (70) and being driven by the flat belt (70), the roller conveyor further having at least one of the braking device of claim 1 mounted to the frame (50) for decelerating at least one of the conveyor rollers (60).

10. A method for producing a braking device for a roller conveyor, comprising the steps of: providing an eccentric shaft (20) with a polygonal cross-section; arranging at least one first eccentric (24) on the eccentric shaft (20) in a form-locking manner to prevent a relative rotation of the first eccentric (24) relative to the eccentric shaft (20); engaging at least one brake pad (40) with the first eccentric (24); and providing a stepping motor (10) for driving the eccentric shaft (20).

* * * * *